INVENTORS:
Bernard Schreiber
Hubert Redemann

Karl F. Ross
Attorney

Bernard Schreiber
Hubert Redemann
INVENTORS.

United States Patent Office 3,398,929
Patented Aug. 27, 1968

3,398,929
SHAFT-JOURNALING ASSEMBLY FOR
ROTARY MACHINES
Bernard Schreiber and Hubert Redemann, Cologne-
Merheim, Germany, assignors to Linde Aktienge-
sellschaft, Wiesbaden, Germany, a corporation of
Germany
Filed Jan. 28, 1966, Ser. No. 524,965
9 Claims. (Cl. 253—39)

ABSTRACT OF THE DISCLOSURE

An expansion turbine with a vertical shaft carrying at its top a turbine rotor within an expansion chamber so that the upper part of the shaft is cooled by the expanding gas with reference to the lower part; the shaft is journaled at its cooler upper part in a gas bearing just below the expansion chamber and at its warmer lower part in an oil bearing whose frictional drag can be adjusted. The two bearings are bridged by a thermally insulating shell within which a stationary sleeve surrounds the shaft to define therewith a narrow annular space for the passage of some of the gas from the expansion chamber toward the oil bearing whereby intrusion of lubricating liquid into the expansion chamber is prevented.

Our present invention relates to bearing assemblies for rotatively journaling high-speed shafts of rotary machines such as turbines, with respect to a housing or support structure.

It is a common practice in dealing with high-speed rotary machines (such as expansion turbines), whereby the potential energy of a compressed or liquefied gas is converted to kinetic energy by expansion to drive a rotor, to journal the rotary shaft and the shafts of free-wheeling or rapidly moving machine elements with respect to a housing or support structure with oil-lubricated or gas-lubricated bearings. The term "oil-lubricated" is here used to refer to all sorts of liquid-lubricated bearings, regardless of the composition of the lubricating liquid. Thus, where the shaft is journaled at two axially spaced locations, the bearings provided distally of the turbine or working end of the shaft and the bearing provided proximately thereto both are either of the gas-lubricated or of the oil-lubricated type. While gas-lubricated bearings are advantageous in circumstances in which high relative speeds are involved, it has been found that the expense of such bearings has limited their widespread application because of the intricate machining techniques required and the other precautions necessary for maintaining gas bearings in an effective condition. On the other hand, oil bearings have frequently been found to be unsatisfactory where the bearing structure is exposed to very low temperatures or high temperature differentials because of the changes of viscosity of the oil or other lubricant resulting from such temperature conditions. Thus it has not been possible heretofore to rotatively support high-speed shafts of rotating machines, at least at two axially spaced locations, with a high degree of effectiveness.

It is, accordingly, an important object of the present invention to provide a journaling system for rotary machines, having a high-speed shaft supported in a housing structure at least at two spaced-apart locations, whereby the aforementioned disadvantages can be obviated and satisfactory journaling of the shaft can be obtained at substantially lower cost than has been possible heretofore.

A further object of this invention is to provide an improved system for rotatively supporting the shaft of an expansion turbine or other machine exposed to extraordinary temperatures and/or temperature differentials whereby detrimental effects of these temperature conditions can be obviated.

These advantages and others will become apparent hereinafter, in accordance with the present invention, in a journal assembly or system for a rotating machine having a high-speed shaft and a support structure rotatively carrying this shaft, which comprises two axially spaced bearings interposed between the support structure and the shaft, the bearing including at least one gas-lubricated bearing and at least one oil-lubricated bearing. We have found that this arrangement is highly satisfactory when the shaft cannot be supported over a large axial distance but must be journaled at limited, spaced-apart locations, the system being further characterized by the advantages obtainable heretofore only with two or more gas bearings, at substantially reduced cost.

It will be apparent that the gas-lubricated bearing of this invention will be disposed at the location along the shaft at which it is exposed to those influences which have rendered oil-lubricated bearings unsuitable for use in similar locations.

More specifically, it will be seen that a feature of this invention resides in the provision of a journal system of this character in an expansion turbine or other apparatus in which one axial location is exposed to sharp temperature differentials or other extreme thermal conditions (e.g. temperature differences from ambient), such differentials being most disadvantageous to oil-lubricated bearings. Thus a bearing location proximal to the rotor of a turbine, in which compressed or liquefied gases at low temperature are expanded to convert the potential energy to kinetic energy of shaft rotation, is constituted as the gas bearing of the present assembly while the bearing means located distilly from this region of severe temperature conditions is provided with the oil-lubricated bearing and can be maintained at normal room temperature by providing between the bearing locations an insulating means capable of reducing heat conduction between the bearing locations.

According to a further feature of this invention, the support structure and the shaft are generally upright so that the lubricants can be separated from one another with ease. In this case, the rotor is disposed at the upper end of the shaft and the gas-lubricated bearing is provided proximally to the rotor and, preferably, is formed with a pressurizable clearance between the bearing surface which opens into the expansion chamber of the housing in which the rotor is disposed. Under these circumstances the pressurizing gas can be caused to escape at least partly into the expansion chamber and thence through the outlet by which the expanded gases are led from the turbine. In this arrangement, the pressurizing gas can be branched from the duct supplying the expandable gas to the turbine so that the lubricant of the gas bearing and the turbine gas are identical. Furthermore, it has been found to be advantageous to direct part of the pressurizing gas of the lubricating stream from the clearance along the shaft in the direction of the oil-lubricated bearing; this gas can thus be recovered via a duct system below the turbine. It has been found to be of special advantage when the descending stream of lubricant gas from the gas-lubricated bearing is passed through a sleeve surrounding the shaft with axial clearance and is led off in the region of the oil-lubricated bearing so that this gas deflects downwardly and entrains oil particles discharged from the oil-lubricated bearing.

Still another feature of this invention resides in the provision of control means for varying the frictional resistance to rotation of the shaft exerted by the oil lubricated bearing, thereby decreasing the operating rate of the turbine and thus the effectiveness of the latter in depleting the potential energy of the gas. It has been found that the resistance of the oil-lubricated bearing can be effectively increased by decreasing the spacing between the juxtaposed bearing surfaces to which the oil is forced at high pressure, by increasing the effective juxtaposed surface areas of the bearing to increase the total friction surface, and/or by varying the temperature of the pressure oil before its entry inot the oil-lubricated bearing. The last step permits control of the oil-bearing temperature as well.

The foregoing and other objects, features and advantages of the present invention will become more readily apparent from the following description, reference being made to the accompanying drawing in which.

Figure 1:
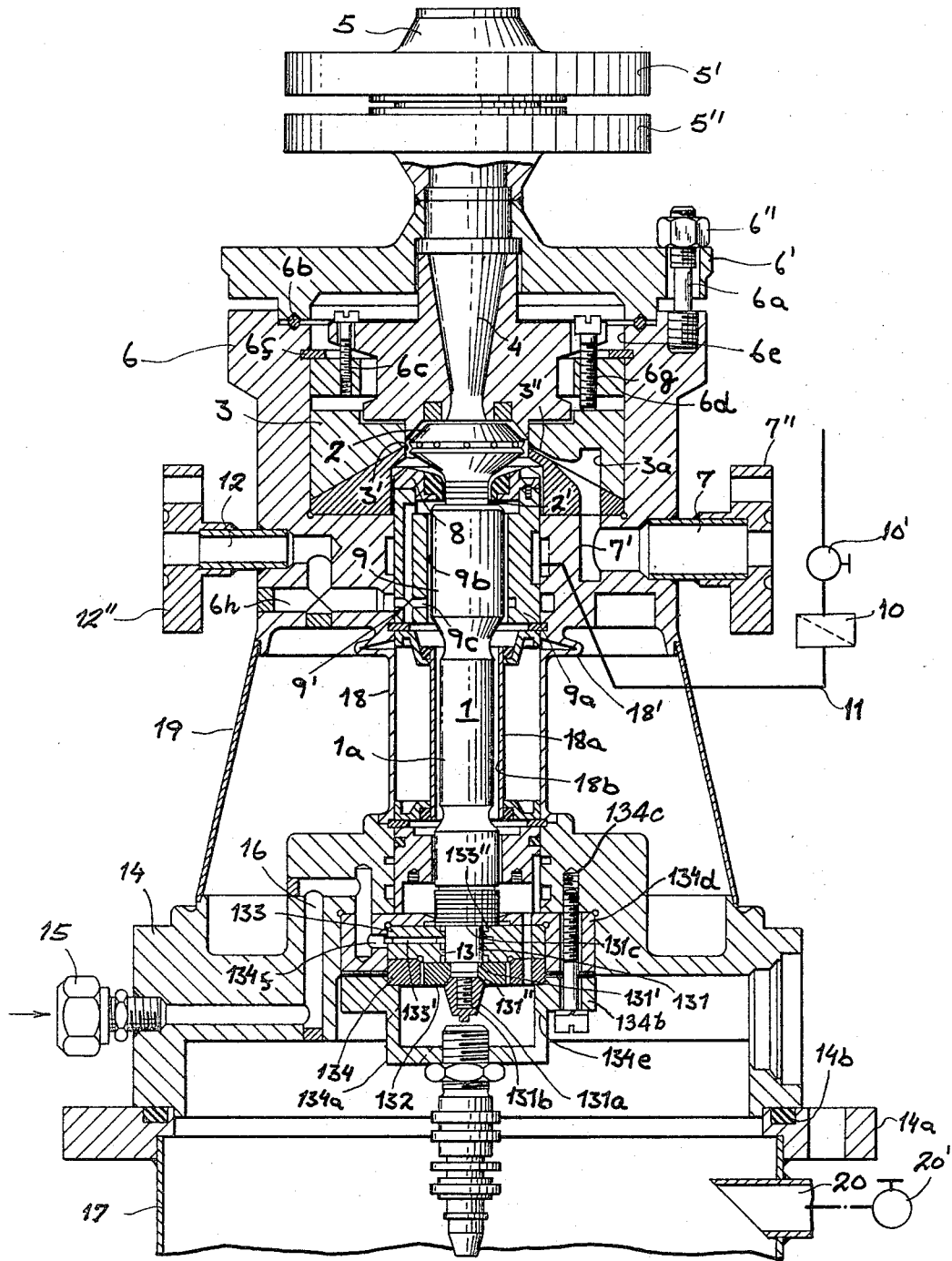
FIG. 1 is an axial cross-sectional view through an expansion turbine for a gas-rectification plant or the like, according to the present invention.

In FIG. 1 we show an expansion turbine for use in air-rectification installations or other apparatus in which the expansion of a compressed or liquefied gas is required and which comprises an upright turbine shaft 1 whose upper end 2' receives a turbine rotor 2 which is disposed within an expansion chamber 3' formed within a nozzle ring 3. The nozzle openings 3" of this ring are directed at the vanes of the turbine rotor 2 and are supplied with the expandable gas via the passage 3a in nozzle ring which forms a manifold for a plurality of nozzle openings 3".

A gas-inlet duct 7 supplies the expandable gas to a passage 7' communicating with the manifold 3a and is flanged at 7" for attachment to the gas line. An outlet 4, in the form of a conically divergent diffuser, is provided within the housing 6 to conduct the expanded gas from the chamber 3' to the oulet duct 5 for further use. The outlet duct 5 is mounted by flanges 5', 5" on the housing 6 via a cover plate 6' thereof which is tightened by nuts 6" engageable with double-threaded screws 6a. An annular seal 6b is clamped between the cover plate 6' and the housing 6 and serves to prevent the escape of expanded gas after it has passed through the diffuser 4. The latter is urged axially downwardly by screws 6c threaded into a clamping ring 6d which is axially movable within the housing compartment 6e but is lodged against an abutment formed by a spring ring 6f. Positioning screws 6g (one shown) define the distance between the diffuser body 4 and the nozzle ring 3 to set the gap between this body and the rotor 2 at the optimum value.

In close proximity to the turbine rotor 2, and separated therefrom only by an axial seal 8, we provided a gas-lubricated bearing generally designated 9' and mounted at the bearing location 9 of the shaft 1. The shaft 1 is enlarged at the bearing location 9 and formed with a cylindrical bearing portion closely surrounded by a bearing sleeve 9a forming therewith a clearance 9b which is supplied with pressurizing gas via a gas duct 11. The pressurizing gas is diverted from the gas-inlet pipe 7 and fed to the bearing 9' via a fine filter 10 and a control valve 10'. The pressurizing gas is withdrawn from the clearance 9b, to which it is fed by passages not illustrated, via channels 9c which register with passages 6h in the housing wall and communicate with an outlet pipe 12 whose flange 12" enables the outlet to be connected to a system for recovering for reuse the pressurized gas.

At the lower end of the turbine shaft 1, we have provided a second bearing means 13 which is constituted as an oil-lubricated radial-axial bearing and thus not only rotatably supports the shaft 1 but forms a thrust bearing therefor. The bearing 13 is mounted in a lower housing portion 14 of the support structure. The housing portion 14 is mounted upon a pedestal 14a via a seal 14b in axial alignment with an oil reservoir 17 in which oil discharged from the baring 13 is collected.

The oil-lubricated bearing 13 is formed at a reduced-diameter portion 131 of the shaft 1 whose extremity carries a thrust ring 132. The latter is held against the shoulder 131' of the bearing portion 131 of the shaft by the frustoconical clamping surface 131" of a nut 131a threaded onto the stud 31b. The bearing ring 132 is surrounded by a ring 134 which is clamped in the housing 14 by a closure 134a whose flange 134b is connected by screws 134c to the main housing portion against a further bearing ring 134d. The closure 134a has an opening 134e for escape of oil into the reservoir 17. A fitting 15 in the housing 14 communicates with a passage 16 for the delivery of oil under pressure to the ring 134d whose outlet 134f opens into the channels 133' and 133" surrounding the bearing portion 131 of the shaft. The channels 133' and 133" are formed in a ring 133 which is engaged by the ring 132 on one side and the shoulder 131c on the other side to form the thrust bearing and which applies the oil film along the surface 131 for rotatably journaling the shaft 1. The ring 134 forms with bearing ring 132 a liquid brake; since the confronting or juxtaposed surfaces carried by the shaft and the support structure are smooth and substantially complementary, they act akin to the juxtaposed surfaces of any dynamic bearing and brake frictionally the freewheeling of the turbine shaft. The frictional heat at the bearings is carried away by the fluids which serve as lubricants and the total quantity of lubricant corresponds to the liquid discharge from the lower thrust-bearing and brake surfaces. The gas lubricant can be returned to the gas system in which the turbine is connected.

As has been indicated earlier, the turbine housing 6 is, as a consequence of the expansion of the gas, at relatively low temperature while housing 14 is maintained at a higher temperature and, according to a feature of this invention, a longitudinally extensible equalizing tube or sleeve 18 is provided between the bearing structures of the gas bearing at the cold end of the turbine and the oil-lubricated bearing at the warm end. The tube 18 is surrounded by an insulating shell 19 of frustoconical configuration and can also be composed of a material having low thermal conductivity. A corrugation 18' in this tube can permit the desired degree of extensibility. Within the equalizing tube 18, we provide between the gas bearing 9 and the oil bearing 13 a shaft-enclosing sleeve 18a which closely surrounds the shaft. The clearance 9b of the gas bearing communicates with the axially extending annular space 18b between the stationary sleeve 18a and the central portion 1a of the shaft 1. A portion of the bearing gas thus passes at high velocity along the shaft 1 downwardly and prevents oil particles from rising along the shaft during the high-speed rotation thereof. The gas and oil particles at the oil-lubricated bearing flow past the bearing surfaces thereof and are collected in the oil reservoir 17. This reservoir has an outlet 20 for discharge of gas at an upper end and a further outlet at its lower end (not shown) for the liquid lubricant. A throttle valve 20' at the outlet 21 serves to maintain an elevated pressure in the reservoir 17 so that any fluid passing into the latter must overcome a predetermined adjustable back pressure, thereby affording means for controlling the lubricant through the lower bearing.

Figure 2:
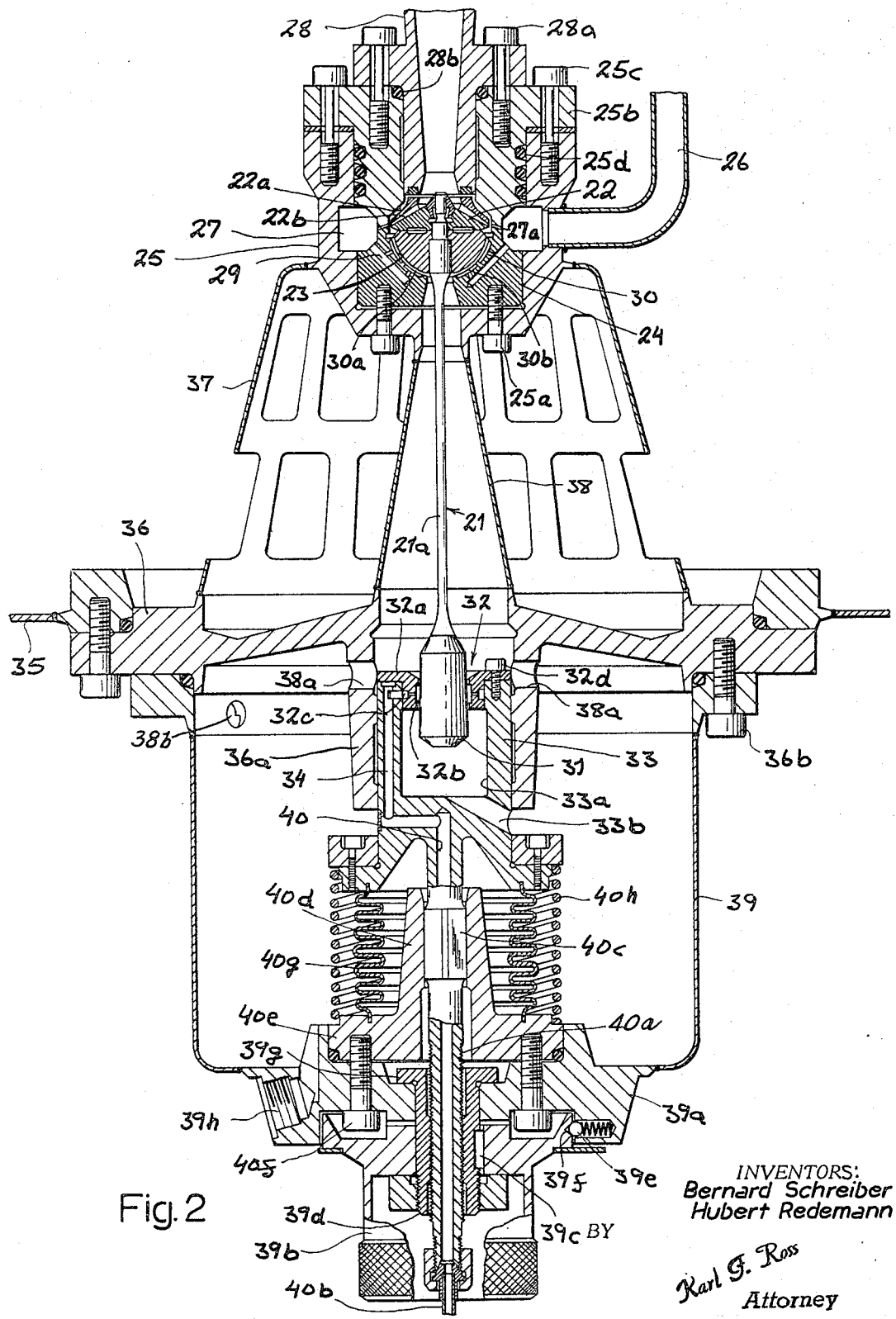
FIG. 2 is an axial cross-sectional view of another turbine provided with a journaling system in accordance with this invention.

In FIG. 2 we show a modified journal arrangement for a turbine which, although similar in overall characteristic to that of FIG. 1, affords greater facility for controlling the braking action of the oil-lubricated bearing and also permits the gas-lubricated bearing to act in part as a thrust bearing. The turbine shaft 21 of FIG. 2 is provided with a turbine rotor 22 at its upper end within an expansion chamber 22a, the rotor 22 carrying a downwardly convex generally spheroidal bearing body 23. The spheroidal surface of the latter is complementary to and closely juxtaposed with a surface 30a at which nozzles 30 of a gas bearing open. Member 23, attached to the shaft 21 of the rotor 22, forms one of the parts of a gas bearing whose stationary part 24 is a nozzle ring mounted in the housing 25 of the turbine by bolts 25a. The housing 25 is closed by a cover 25b, removably attached by screws 25c to the main housing portion and forming a support for a diffuser 28, connected thereto by bolts 28a. Seals 28b and 25d between the diffuser 28 and the cover 25b and between this cover and the main housing portion 25 prevent escape of compressed gas or expanded gas from the turbine chamber 25a. The housing is provided with an inlet 26 for the compressed or liquefied gas to be expanded in the rotor chamber and to serve as the pressurizing gas for the gas bearing. Inlet 26 communicates with an annular manifold channel 27 formed between the main housing portion 25 and the ring 24, this channel communicating with the nozzle passages 27a of the turbine whose rotor passages are shown at 22b. The gas is supplied via ducts 29 to the nozzles or pockets 30 of the gas-bearing ring 24 and thus to the clearance 30b between the surfaces. Since the juxtaposed gas-bearing surfaces extend at least in part transversely to the vertical axis of the turbine, they function as a thrust bearing for supporting the shaft assembly in the vertical direction and as a rotary journal for the shaft as well. To restrict thermal conductivity between the very cold upper region of the assembly and the warm (room temperature) lower portion thereof, the shank 21a of shaft 21 intermediate the upper and lower bearings is very slender. The enlarged upwardly converging frustoconical stub 31 at the lower end of shaft 21 forms a bearing surface for the oil-lubricated bearing generally designated 32. The oil-lubricated bearing disposed at the relatively warm lower end of the assembly comprises a bearing ring 32a surrounding the stub 31 and defining therewith an annular gap 32b for the lubricating oil. The latter is fed under pressure to the juxtaposed bearing surfaces via a passage 32c in this ring from a channel 34 of a cylindrical support bushing 33 to which the ring 32a is secured by bolts 32d. The bushing 33 is closed to form an oil-collection compartment 33a which communicates via duct 33b with an oil reservoir 39 forming a housing for the lower bearing assembly below the pedestal 36 of the support structure. The bushing 33 is received within a boss 36a of the pedestal and has an axially extending bore 40 which passes through a threaded shank 40a and communicates with passage 34 so that the lubricating oil can be supplied to the lower bearing by a tube 40b at the underside of the assembly. The shank 40a is formed with a prismatic configuration at 40c and is slidably but nonrotatably received in an upright extension 40d of a guide member 40e mounted in the base of the reservoir 39 by bolts 40f. The base of the reservoir 39a is provided with a rotatable thimble 39b for adjusting the spacing between the juxtaposed bearing surface of the oil-lubricated bearing as well as the effective area of these surfaces in order to control the braking action upon the shaft 21. For this purpose, the thimble 39b, through which the tube 40b for supplying the lubricating oil to the bearings passes, is keyed at 39c to an internally threaded sleeve 39d in engagement with the male threads of the shank 40a. The angular positions of the thimble 39b can be selected with the aid of an indexing device such as a spring-loaded ball 39e which can lodge in recesses 39f of the periphery of the thimble.

It will thus be seen that rotation of the thimble, whose sleeve 39d has a head 39g bearing against the support 39a, tends to draw the shank 40a downwardly or upwardly and thus displaces the ring 32a axially with respect to the frustoconical stub 31 and, consequently, acts to increase or decrease the bearing gap. Since the effective bearing surface area increases with the diameter of the stub 31, this adjustment means also permits control of the effective surface area of the bearing system. A protective bellows 40g surrounds the shank 40a to prevent contaminants and oil from passing into and through the control means. Furthermore, a coil spring 40h resists downward displacement of the bushing 33 to impart to the control device a self-locking action. The oil reservoir 39 is mounted on the underside of the pedestal 36 via screw 36b while the pedestal itself is received in the apparatus shell 35 in the usual manner.

A sleeve 38 of thermally insulating material is disposed between the upper and lower bearings and forms with the shaft 21 an axially extending annular space into which the gas-bearing clearance opens at least in part so that a descending stream of gas passes along the shaft 21 to preclude an upward movement of the liquid lubricant. A frustoconical shield 37 surrounds sleeve 38 and provides additional insulation. The gases flow from the sleeve 38 via passages 38a proximally to the oil-lubricated bearing into the reservoir 39 which has a throttled outlet 38b to control the outflow of gas from the reservoir in the manner previously described. The reservoir 39 is also provided with an outlet 39h for the oil. In general, the system of FIG. 2 operates similarly to that of FIG. 1 and the balance of the pressurizing gas passes into the turbine chamber and thence outwardly to the diffuser 28 along with the expansion gas from which it was originally diverted.

Figure 3:
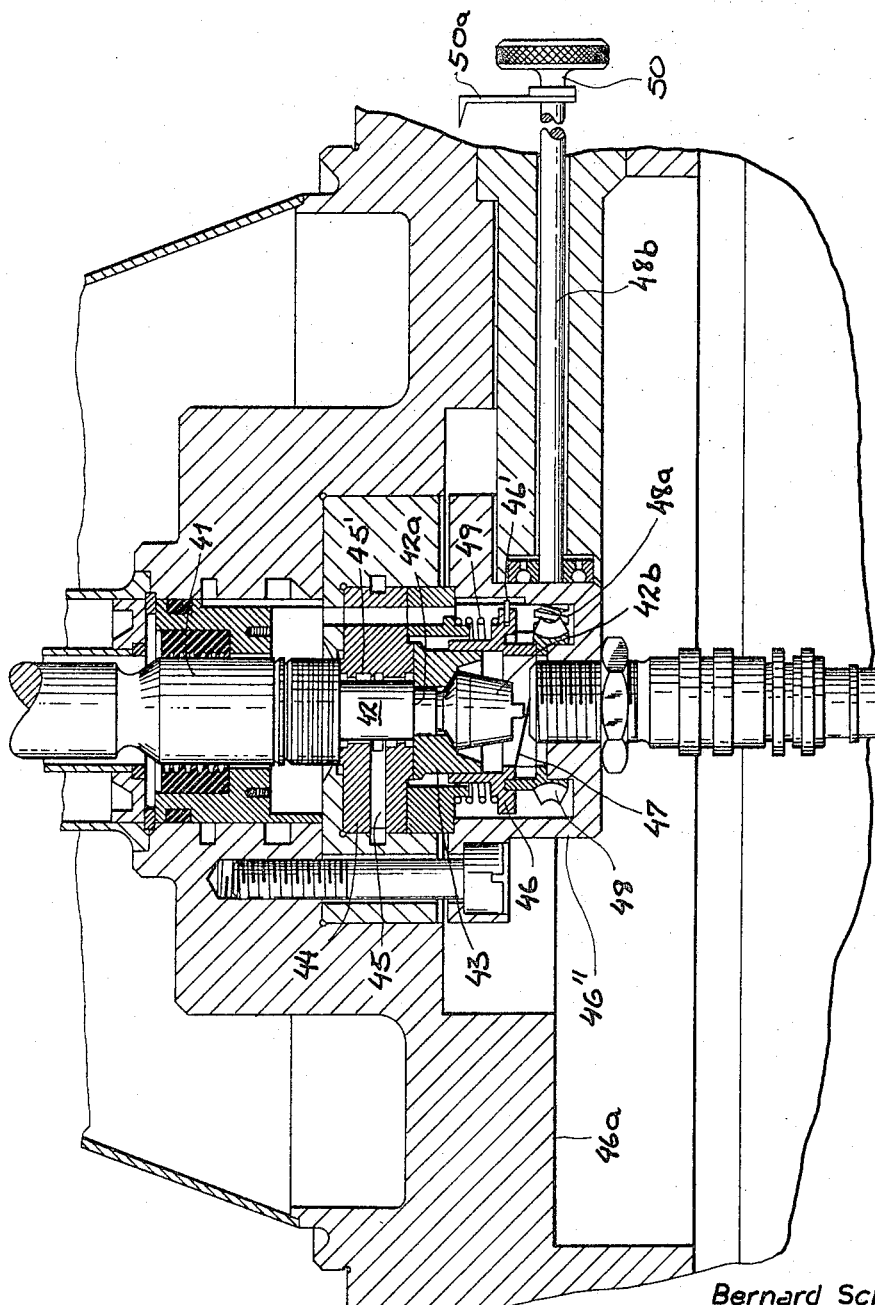
FIG. 3 is a fragmentary axial cross-sectional view of an oil-lubricated bearing having control means in accordance with the present invention.

In FIG. 3, we show an oil-lubricated bearing which can be disposed as the lower bearing of the turbine of FIGS. 1 and 2 in place of the bearing systems there illustrated. The oil-lubricated bearing of FIG. 3 co-operates with a vertical turbine shaft 41 having a reduced-diameter bearing stud 42 akin to that of FIG. 1 and a bearing ring 43 clamped against a shoulder 42a of this stud by a nut 42b. The bearing portion of the shaft 41 is surrounded by a fixed bearing ring 44 whose passage 45 communicates with annular channels 45' at the bearing gap to which the lubricating fluid is directed under pressure. The ring 44 thus constitutes a radial and thrust bearing (double-sided) for the turbine shaft 41. An axially shiftable bearing bushing 46 surrounds the ring 43 so that the effective surface area of the bearing elements 43, 46 can be adjusted by a control means. The control means comprises a worm wheel 48 which cooperates with a worm 48a upon a rotatable control rod 48b whose knob 50 is provided with an indicator 50a to show the position of the bushing 46. The worm wheel 48 is provided with a ramp 47 and is rotatable eccentrically with respect to the shaft for axially displacing a ring 46 which is formed with a complementary configuration and is held by a pin 46' nonrotatably in a housing 46" of the pedestal 46a. A compression spring 49 holds the bushing 46 against the worm wheel 48. Thus, rotation of the worm 48a will relatively displace the worm wheel 48 and the bushing 46 angularly to cause the latter to ride along the ramp 47 and thus alter the axial distance by which it is thrust over the ring 43 to control the braking action of the liquid bearing.

Figure 4:
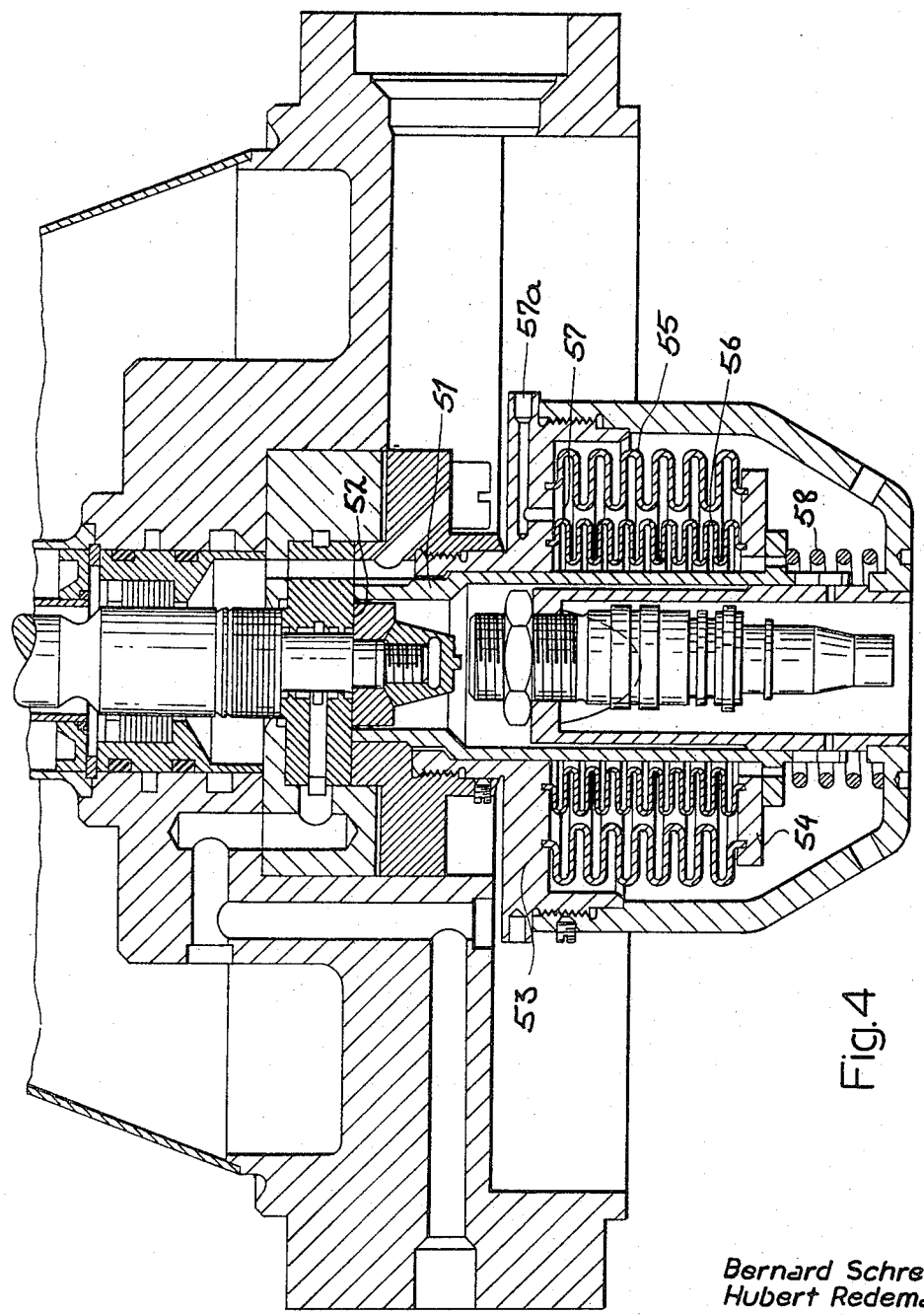
FIG. 4 is a fragmentary axial cross-sectional view of still another oil-lubricated bearing according to this invention.

FIG. 4 shows a modified fluid-responsive control system for the braking action of the liquid bearing. As in the previous embodiment, a bearing ring 52 is locked onto the turbine shaft and co-operates with an axially shiftable bushing 51. A fixed housing portion 53 forms with the bushing 51 an annular compartment receiving two coaxially disposed corrugated pipes 55 and 56 which define an expansion chamber 57 between them. A duct 57a delivers a control fluid (e.g. compressed air or hydraulic fluid) to this expansion chamber which bears axially upon a flange 54 of the axially shiftable bushing 51. A spring 58 resists downward axial displacement of the bushing 51 and also functions as a restoring spring. When the fluid medium is supplied to the expansion chamber, the force of spring 58 can be overcome and the bushing 51 shifted axially to alter the effective surface area of the oil-lubricated bearing. It will be understood that in each of the embodiments described above temperature-control means can be provided in the inlet duct for the liquid lubricant as previously described.

These modifications and others readily apparent to those skilled in the art are intended to be included within the spirit and scope of the invention is defined in the appended claims.

We claim:
1. An expansion turbine for the conversion of potential energy of an expandable low-temperature gas into kinetic energy of rotation, comprising:
   a support structure;
   a shaft journaled in said structure for rotation about an axis;
   housing means forming an expansion chamber at a first location along said axis;
   a turbine rotor in said chamber mounted on said shaft for rotation thereof upon the expansion of gas in said chamber, said chamber having an inlet for gas under pressure and an outlet for expanded gas;
   first bearing means forming a gas-lubricated bearing between said support structure at a relatively cool second location along said axis proximal to said first location;
   second bearing means forming an oil-lubricated bearing between said shaft and said structure at a relatively warm third location along said axis remote from said first and second locations; and
   means rigid with said structure forming a thermally insulating shell along said shaft over a region extending from said second location to said third location.

2. An expansion turbine as defined in claim 1 wherein said structure includes a stationary sleeve within said shell surrounding said shaft and defining therewith an annular space between said bearing, said gas-lubricated bearing being provided with a passage leading from said chamber to said space for discharging a portion of said gas under pressure into said space toward said oil-lubricated bearing, said sleeve having a vent proximal to said oil-lubricated bearing for the discharge of gas from said space.

3. An expansion turbine as defined in claim 1 wherein said oil-lubricated bearing is provided with friction-control means for exerting an adjustable drag upon said shaft.

4. A system as defined in claim 3 wherein said oil-lubricated bearing includes a pair of relatively displaceable juxtaposed surfaces respectively entrained by said shaft and carried by said support structure, said control means including means for varying the effective area of said juxtaposed surfaces.

5. A system as defined in claim 3 wherein said oil-lubricated bearing includes a pair of relatively displaceable juxtaposed surfaces respectively entrained by said shaft and carried by said support structure, said control means including means for varying the distance between said juxtaposed surfaces.

6. A system as defined in claim 3 wherein said control means includes means for varying the temperature of a lubricating liquid delivered to said oil-lubricated bearing.

7. An expansion turbine as defined in claim 1 wherein said axis is vertical, said first bearing means being disposed above said second bearing means and below said chamber.

8. An expansion turbine for the conversion of potential energy of an expandable low-temperature gas into kinetic energy of rotation, said turbine comprising a support structure; a shaft journaled in said structure for rotation about a substantially vertical axis; housing means forming an expansion chamber at an upper portion of said structure in the region of an upper end of said shaft; a turbine rotor in said chamber mounted on said shaft for rotation thereof upon the expansion of gas in said chamber, said chamber having an outlet for expanded gas; first bearing means forming a gas-lubricated bearing between said shaft and said support structure at an upper location along said shaft proximal to and below said rotor; second bearing means forming an oil-lubricated bearing at a lower portion of said shaft remote from said rotor and between said shaft and said structure; first inlet means for supplying a stream of gas under pressure to said gas-lubricated bearing, said gas-lubricated bearing having a pressurized clearance opening into said chamber for escape of a portion of the pressurizing gas into said chamber and passage through said outlet, said structure including a sleeve surrounding said shaft and defining therewith an annular space between said bearings, said clearance opening into said space for discharging a portion of said pressurizing gas downwardly along said shaft in the direction of said oil-lubricated bearing, said sleeve having a vent proximal to said oil-lubricated bearing for the discharge of gas from said space; second inlet means for supplying oil under pressure to said oil-lubricated bearing; and means for collecting oil discharged from said oil-lubricated bearing.

9. An expansion turbine as defined in claim 8, further comprising control means at said second bearing means for varying the frictional resistance supplied thereby to the rotation of said shaft.

References Cited

UNITED STATES PATENTS

| 2,663,977 | 12/1953 | Gerard et al. | 308—9 X |
| 2,910,328 | 10/1959 | Frolich. | |
| 3,105,631 | 10/1963 | Hanny. | |
| 3,258,199 | 6/1966 | Anderson. | |
| 3,309,965 | 3/1967 | Weickgenannt | 253—3 X |
| 3,326,453 | 6/1967 | Kun. | |

FOREIGN PATENTS

| 1,280,154 | 11/1961 | France. |
| 1,239,017 | 10/1959 | France. |

EVERETTE A. POWELL, JR., *Primary Examiner.*